Sprague & Belt,
Cage Trap.
No. 104,896. Patented June 28, 1870.
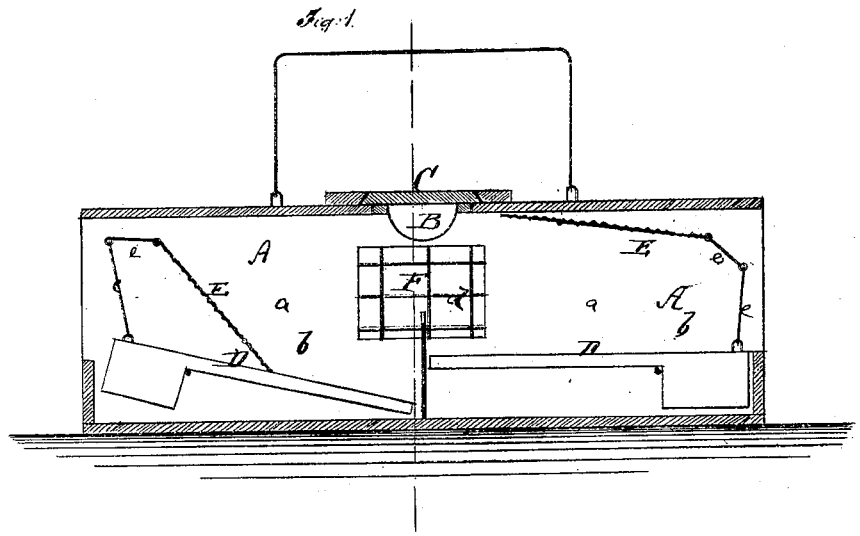
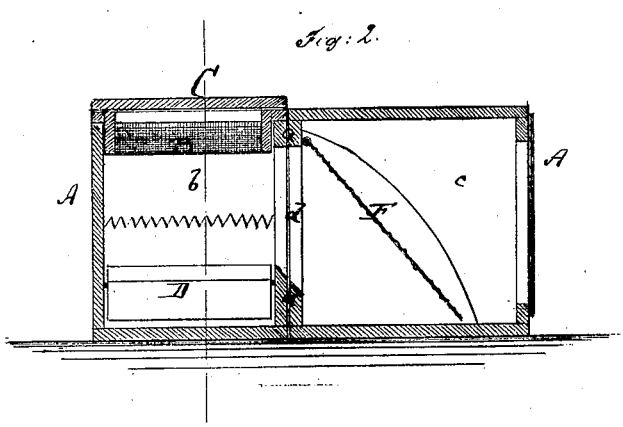
Witnesses:
Chas. Nida
Alex. F. Robert
Inventor:
E. Sprague
G. C. Belt
Per Mmm &
Attorneys.

United States Patent Office.

ELONZO SPRAGUE AND GEORGE C. BELT, OF BRIDGETON, INDIANA.

Letters Patent No. 104,896, dated June 28, 1870.

IMPROVED ANIMAL TRAP.

The Schedule referred to in these Letters Patent and making part of the same

*To all whom it may concern:*

Be it known that we, ELONZO SPRAGUE and GEORGE C. BELT, of Bridgeton, in the county of Parks and State of Indiana, have invented a new and improved Animal Trap; and we do hereby declare that the following is a full, clear, and exact description thereof, which will enable others skilled in the art to make and use the same, reference being had to the accompanying drawing forming a part of this specification, in which—

Figure 1 represents a vertical longitudinal section of our improved animal trap.

Figure 2 is a vertical transverse section of the same.

Similar letters of reference indicate corresponding parts.

This invention has for its object to construct a trap by means of which animals can be readily caught, and which will always remain set without any liability of getting out of order.

The invention consists in providing a double treadle in an open passage, each treadle operating a gate, whereby the escape of an animal once within the passage is absolutely prevented.

A, in the drawing, represents the box, which constitutes the trap. A partition, $a$, divides this box into two compartments, $b$ and $c$. The compartment $b$ is open at both ends, and communicates, by means of an opening, $d$, with the chamber $c$.

The bait is placed in a wire basket, B, which is suspended from the cover of the compartment $b$, and covered by a slide, C, as shown. This slide is fitted into the cover of the box A, so as to be readily removable. It will be seen that the bait is suspended in the middle of the chamber $b$, equally far from both ends of the same.

D D are two treadles, pivoted within the compartment $b$, near both ends of the same. Each treadle is held horizontal by its weighted, but shorter outer end.

When an animal steps upon the inner end of a treadle it will cause the same to swing down, and, by the motion, to close a pivoted wire-gate, E, with which it is connected by rods, $e$ $e$, as shown. When the animal, being thus prevented from returning, but seeing the other end of the chamber $b$ open, attempts to escape by forward motion, it will, by stepping upon the inner end of the other treadle, close also the forward gate. The only escape is thus left through the opening $d$, which is closed by a swinging-gate, F, in the ordinary manner. After the animal has passed the gate F it is confined in the chamber $c$, and further escape is impossible.

Whenever the weight of the animal is removed from a treadle, such treadle will at once resume its horizontal position, while its gate will again be open. The trap is thus always set for newcomers, and cannot get out of order.

Fig. 1 shows one gate, E, closed, and the other open, and their respective treadles in corresponding positions. The bait cannot be removed, and is, therefore, always ready to attract new victims. By having both ends of the passage open, confidence will be produced, and the animals more easily caused to visit the tempting bait.

Having thus described our invention,

What we claim as new, and desire to secure by Letters Patent, is—

The combination of the two treadles D D, in the open passage $b$, with the gates E E and F, and with the bait-holder B, all arranged substantially as herein shown and described.

ELONZO SPRAGUE.
GEORGE C. BELT.

Witnesses:
A. M. JACKS,
C. B. CHENOWETH.